Sept. 23, 1969 A. E. DRAPER 3,468,547

AUTOMATIC SOUND REPRODUCING APPARATUS

Filed June 1, 1967 5 Sheets-Sheet 1

Sept. 23, 1969 A. E. DRAPER 3,468,547

AUTOMATIC SOUND REPRODUCING APPARATUS

Filed June 1, 1967 5 Sheets-Sheet 2

Sept. 23, 1969 A. E. DRAPER 3,468,547

AUTOMATIC SOUND REPRODUCING APPARATUS

Filed June 1, 1967 5 Sheets-Sheet 3

United States Patent Office 3,468,547

Patented Sept. 23, 1969

3,468,547
AUTOMATIC SOUND REPRODUCING APPARATUS

Albert E. Draper, London, England, assignor to S. Korobuk Limited, London, England Filed June 1, 1967, Ser. No. 642,847
Int. Cl. G11b 17/08
U.S. Cl. 274—10 7 Claims

ABSTRACT OF THE DISCLOSURE

Automatic sound reproducing apparatus for playing disc records in which the pick-up arm is moved outwardly at the end of a record playing operation and inwardly to start playing another record by a lever system including a main lever relative to which the pick-up arm is movable, the pick-up arm being first moved out against a stop, held whilst the main lever continues its movement to an extent determined by a sizing mechanism, and then returned by return movement of the main lever so that its inward movement is determined by the sizing mechanism.

This invention relates to automatic sound reproducing apparatus of the kind in which disc records of various sizes are fed singly or in succession on to a turntable and to apparatus of this kind wherein means is provided whereby the extent of inward movement imparted to the pick-up transversely of the turntable, as a preliminary to the engagemtnt of the stylus with the record to be played, is made to correspond with the radius of that record. It is an object of the invention to provide a simplified apparatus of the kind referred to.

According to the present invention, in automatic sound reproducing apparatus of the kind referred to, a system of levers operated by a cycling cam co-operate with the pick-up arm to swing the pick-up outwardly clear of the record or records at the completion of a playing operation and to swing it inwardly to a starting position for playing the next record, the connection of the cycling cam to the pick-up arm being interrupted during record playing to leave the said pick-up arm free to follow the record groove and being made automatically at the commencement of a cam cycle, the lever system including one lever moved by the cycling cam through an angle governed by a record sizing mechanism and interengaging means capable of locating the pick-up arm relative to the said one lever in any one of a number of relative positions, being provided between said one lever and a member which swings inwardly and outwardly with the pick-up arm, the said interengaging means, at the commencement of a revolution of the cycling cam, interconnecting the said one lever and the pick-up arm in relative positions such that the pick-up arms is swung outwardly against a stop during a first portion of the angular movement of said one lever and continued movement of the said one lever to a position governed by the sizing mechanism moves it relative to the member swinging with the pick-up arm to another position of interengagement at which their angular relation depends on the angle of movement of said one lever permitted by the sizing mechanism so that the inward swing of the pick-up arm during the completion of the revolution of the cycling cam brings the pick-up arm back to a position depending on the size of the record and lowers it to engage the stylus with the said starting groove of the said record.

The interengaging means may comprise locations on said one lever formed by a plurality of grooves or notches at positions spaced angularly about the pivot of said lever, and a pin adapted to engage in one or other of said grooves or notches.

The invention is hereinafter described with reference to the accompanying drawings, in which.

Figure 1:
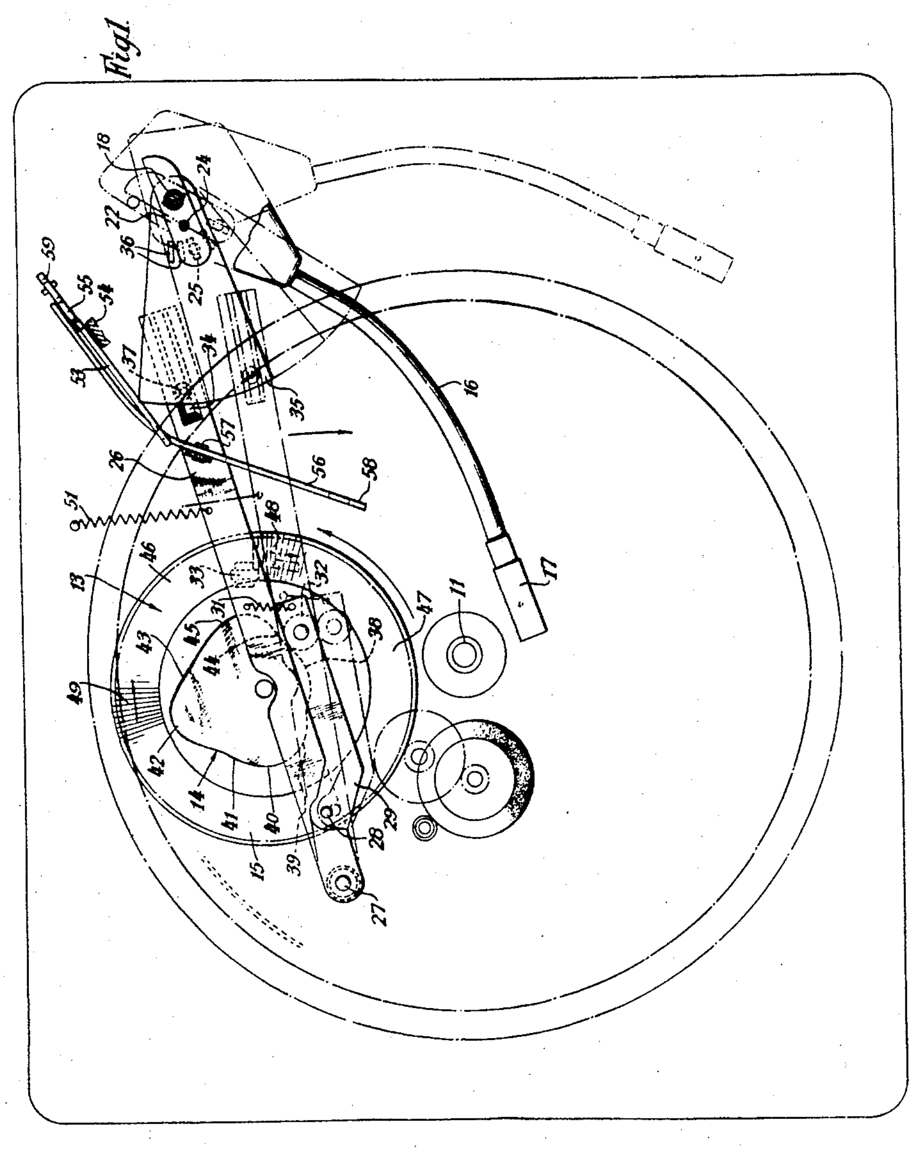
FIGURE 1 is a plan view showing one embodiment of the invention, only those parts of the apparatus which are directly concerned with the present invention being shown.
Figure 2:
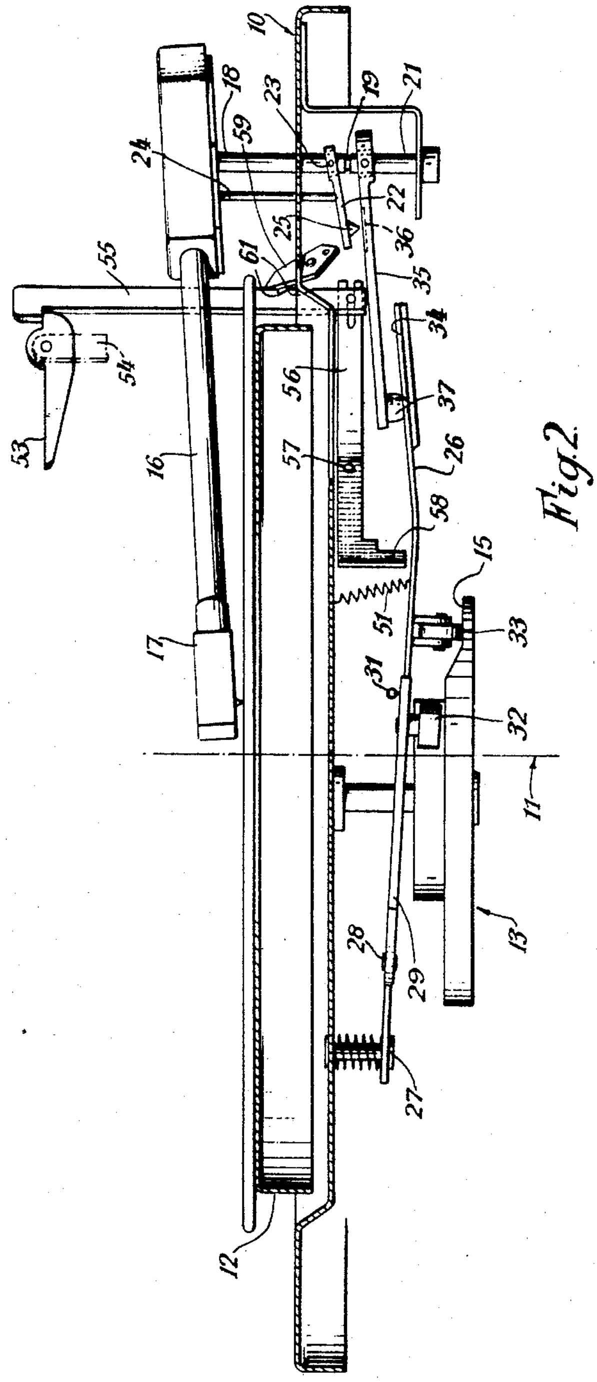
FIGURE 2 is a side elevation of the apparatus shown in FIGURE 1.
Figure 3:
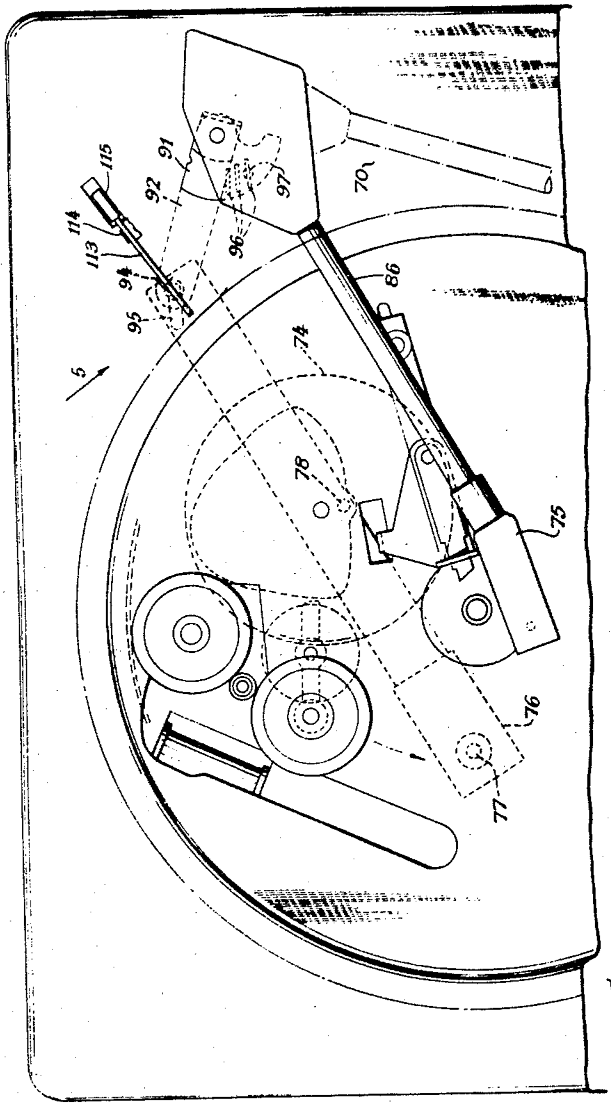
FIGURE 3 is a plan view, similar to FIGURE 1, showing another embodiment of the invention.

Referring to FIGURES 1 and 2 of the drawings, a base-plate 10 carries a spindle, indicated at 11, on which a turntable 12 (FIGURE 2) is mounted, the turntable having been omitted from FIGURE 1. The spindle extends upwardly from the turntable, and is of any well-known form capable of supporting a plurality of records in a stack above the turntable and releasing them one-by-one to drop on to the turntable for playing. The turntable is driven in the conventional manner by an electric motor (not shown) which also drives a cycling cam 13, the drive to the cam 13 being automatically engaged by a trip mechanism when the pick-up stylus runs into the run-out groove of a record, and being stopped automatically when the said cam has completed one revolution. Mechanisms for driving a cycling cam in this manner are well known. The cycling cam 13 includes an edge cam 14 and a face cam 15, which will be further described below.

A pick-up arm 16 carrying a pick-up head 17 is pivoted for movement in a vertical plane on a pillar 18 which is itself rotatable about a vertical axis so that the pick-up head can move up and down and also swing across a record on the turntable. The pillar 18 is supported on a ball 19 carried by a co-axial post 21 also rotatable about the common axis. An arm 22 pivotally mounted at 23 on the pillar 18 so as to be capable of swinging up and down is linked by a rod 24 to the pick-up arm so that the two arms rise and fall together. The arm 22 carries a downwardly-projecting pin 25 with a pointed lower end.

A lever 26, pivoted for horizontal movement on the base-plate 10 at 27, and also free to swing up-and-down about its pivoted end, has pivotally mounted on it at 28 a secondary lever 29 urged by a tension spring 31 to the position shown in FIGURE 1, in which it lies against one side of the lever 26. The secondary lever 29 carries a roller follower 32 to engage the edge cam 14, and the lever 26 carries a roller follower 33 to engage the face cam 15. The lever 26 has in its upper surface, at its end remote from the pivot at 27, a longitudinal groove 34.

A third lever 35, which is sector-shaped in plan, is mounted on the post 21 so as to be capable of swinging up-and-down about a diametral pin passing through the post, there being formed, in the upper surface of the said third lever 35, a series of angularly spaced V-shaped grooves 36 radiating from the post axis. The lever 35 carries a downwardly-projecting lug 37 to engage in the groove 34 on the lever 26.

The edge cam 14 of the cycling cam 13, which rotates in an anti-clockwise direction as shown in FIGURE 1 is symmetrical, having a dwell portion 38 of minimum radius, a lift portion 39 between one end of the dwell portion 38 and a further dwell portion 40 of larger radius, another lift portion 41 extending to a peak 42, and fall portions 43 and 44 corresponding to the lift portions 41 and 39 respectively with another dwell portion 45 between them. The face cam 15 has a low portion 46 and a high portion 47 connected by ramps 48 and 49.

A tension spring 51 acting on the lever 26 urges the roller follower 32 against the edge cam 14, and the roller follower 33 is urged against the face cam 15 by gravity.

In the idle position of the cycling cam 13, the roller follower 32 has just left the fall portion 44 of the edge cam and is resting on the dwell portion 38, whilst the roller follower 33 is resting on the low portion 46 of the face cam just before the lift ramp 48. The lever 26 is in the position shown in FIGURE 2, the lug 37 being in engagement with the slot 34, but, owing to the pick-up arm 16 being supported by the pick-up stylus resting on a record 52 on the turntable, the pin 25 is free of any of the grooves 36 so that the pick-up arm is free to swing across the record independently of the levers 26 and 35.

A sizing trigger arm 53, pivotally mounted on a suitable support at 54, is arranged to be rocked in an anticlockwise direction as shown in FIGURE 2 by records falling from the stack on the spindle on to the turntable. A vertically movable link 55, lifted by such rocking movement of the trigger arm 53, is coupled at its lower end to a stop arm 56, itself movable in a vertical plane about a pivot at 57 and carrying a stepped stop lug 58 movable by lifting of the link 55 into the path of the lever 26. A detent 59 co-operates with notches at 61 in the link 55 to retain the latter in a position to which it is raised by the trigger arm 53, the detent 59 being released automatically by known means at the completion of a cam cycle. The trigger arm 53 is so arranged that it is engaged by only 10 inch and 12 inch records, and not by 7 inch records, it being evident that a 12 inch record will rock it through a greater angle than will a 10 inch record.

The apparatus described with reference to FIGURES 1 and 2 operates in the following manner. The pick-up arm, at the completion of the playing of a record, is in the position shown in FIGURE 1. The commencement of a cycle of movement of the cycling cam 13 first raises the lever 26 due to the follower 33 riding up the ramp 48, causing the pin 25 to enter a groove 36 in the lever 35, after which the arm 22 and the pick-up arm 16 are lifted to clear the stylus from the record. The follower 32 now runs on to the lift portion 39 of the edge cam, and the pick-up arm is swung outwardly clear of the record, against a stop (not shown). Whilst the follower 32 is passing over the dwell portion 40 of the edge cam, the next record is dropped on to the turntable and, if it is of 10 inch or 12 inch size, operates the trigger arm 53 to bring one or other of the stop surfaces on the stop lug 58 into the path of the lever 26. The follower 32 now rides up the lift portion 41 of the edge cam, moving the lever 26 further in the clockwise direction until it engages the stop surface on the lug 58 which is in its path. Since the pick-up arm is held against further outward movement, the lever 35 moves relatively to the arm 22, and the pin 24 is moved into another groove on the said lever 35. When the lever 26 is stopped by the stop lug 58, the roller follower continues to follow the edge cam profile, the lever 29 moving away from the lever 26 until the peak 42 is reached. The pick-up arm then swings inwardly as the roller 32 runs down the fall portion 43 of the cam, being brought to a position over the starting groove of the record, and, whilst the said roller is on the dwell portion 45 of the cam, the roller 33 runs down the ramp 49, bringing the stylus into engagement with the record and immediately moving the lever 35 clear of the pin 25, so that no restraint is applied to the pick-up once the stylus has engaged the record. Since the point at which disengagement of the pin 25 from the lever 35 takes place depends on the point at which the weight of the pick-up ceases to be supported by the lever 35, the disengagement immediately follows engagement of the stylus with a record regardless of whether one or more records are already on the turntable. The final movement of the cycling cam brings the levers 26 and 35 back to their initial positions ready for the commencement of the next cycle. If the record dropped on to the turntable is a 7 inch record, the lever 26 swings clockwise through its full stroke to engage the pin 24 with a groove in the lever 35, and the pick-up is swung inwards far enough to engage in the starting groove of a 7 inch record.

Figure 6:
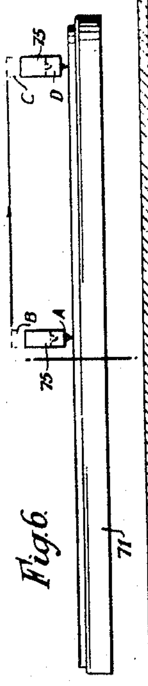
FIGURE 6 is a diagrammatic side view of the turntable illustrating the movements of the pick-up.
Figure 7:
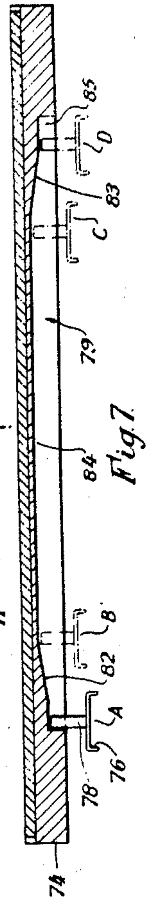
FIGURE 7 is a development of the cam slot in the cycling cam.
Figure 4:
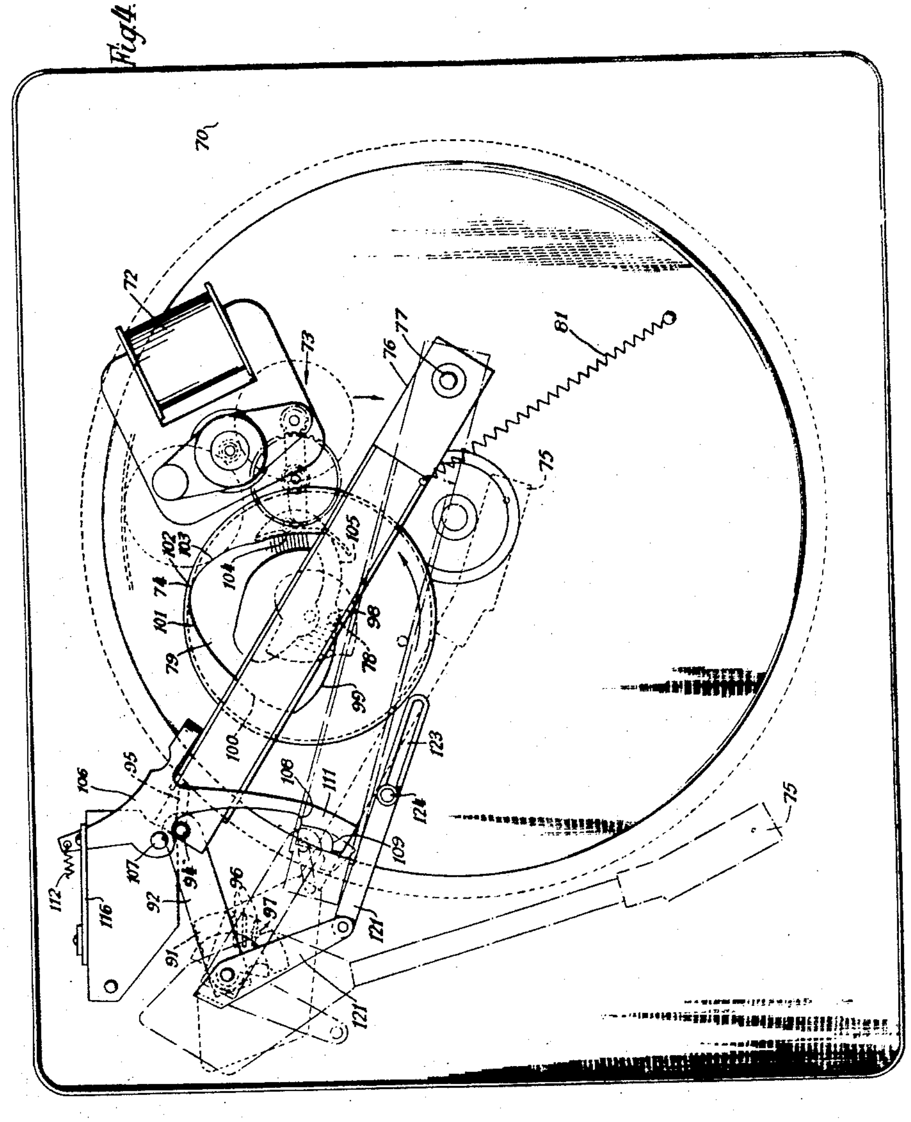
FIGURE 4 is an underneath plan view of the apparatus shown in FIGURE 3.
Figure 5:
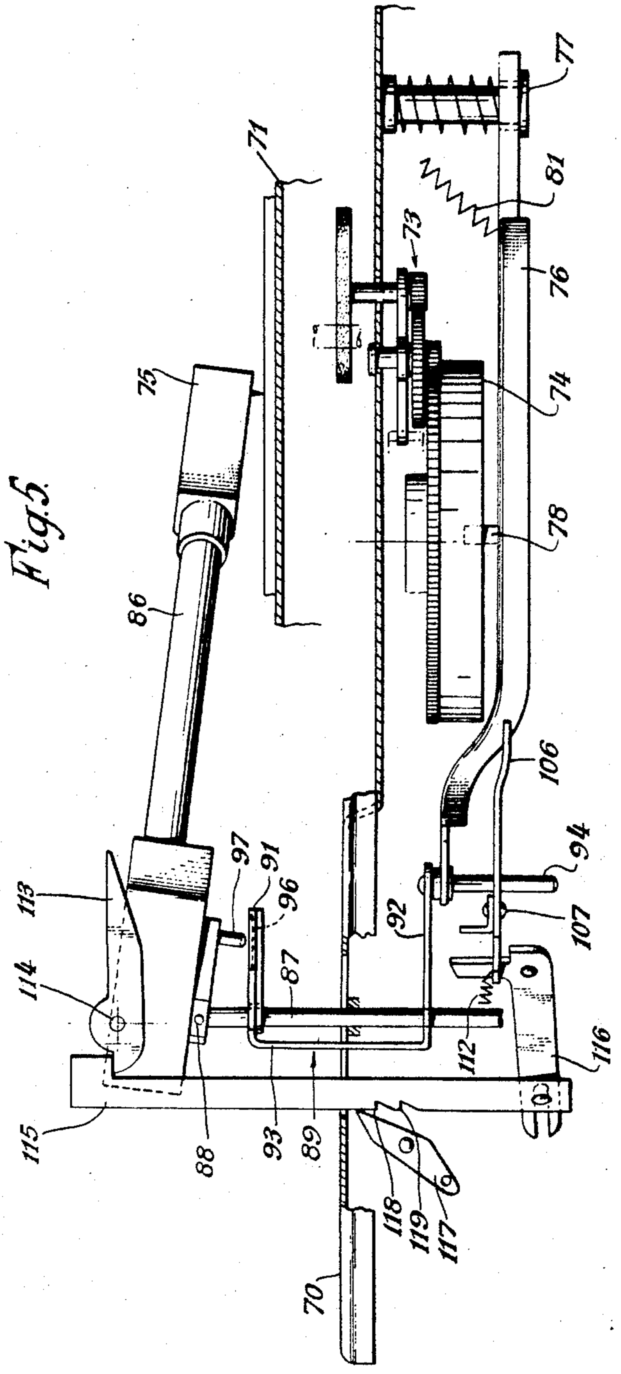
FIGURE 5 is a side elevation of the apparatus shown in FIGURES 3 and 4 looking in the direction of the arrow 5 in FIGURE 3.

Referring now to FIGURES 3 to 7 of the accompanying drawings, the apparatus comprises a base-plate 70 and turntable 71 (FIGURE 5), the turntable being driven by an electric motor 72 which also drives, through a disengageable transmission system 73, a cycling cam 74, conventional means being provided to engage the transmission system 73 when the machine is started, or when the playing of one record has been completed, to bring the stylus of a pick-up head 75 into position for starting to play a record. The turntable has mounted at its centre an upstanding spindle of known type (not shown) capable of supporting, above the turntable, a stack of records to be played, the spindle having provided on it a record releasing mechanism, also of conventional type, which releases the records one-by-one to allow them to fall onto the turntable for playing. A lever 76, pivoted at 77 on the base-plate 70 so as to be capable of swinging in a plane parallel to the said base-plate and also to move up and down about its pivoted end, carries a follower pin 78 projecting into a cam recess 79 in the underside of the cycling cam, the follower pin 78 being urged by a spring 81 acting on the lever 76 against the outer edge of the cam recess 79. The spring 81, being mounted in an inclined position, also urges the lever 76 upwardly to hold the end of the pin 78 against the bottom of the recess. The recess has portions of two different depths connected by ramps 82 and 83 as shown in FIGURES 4 and 7, the deeper portion being shown at 84 and the shallower portion at 85.

The pick-up head 75 is mounted on a pick-up arm 86 itself mounted to swing across the turntable on a post 87, the said pick-up arm also being pivoted at 88 for up-and-down pivotal movement. Another lever 89, having vertically spaced upper and lower arms 91 and 92 connected by a bar 93, pivots about the post 87, the lower arm 92 carrying a pin 94 which engages in a slot 95 in the lever 76, and the upper arm 91 being quadrant shaped and having formed in its upper surface a number of angularly spaced grooves 96. The pick-up arm 86 carries on its underside a downwardly-projecting pin 97, pointed at its lower end, to engage in one or other of the grooves 96.

The cycling cam 74 rotates anti-clockwise as shown in FIGURE 4, and the outer edge of its recess 79 has a dwell portion 98 of small radius which is engaged by the follower pin 78 when the said cam is in its stationary position, an increasing radius portion 99 leading from the dwell portion 98 to a further dwell portion 100 of larger radius, another increasing radius portion 101 leading to a peak at 102, a decreasing radius portion 103 extending from the peak 102 to a further dwell portion 104, and a final decreasing radius portion 105 extending from the dwell portion 104 to the dwell portion 98. The shallower portion 85 of the cam recess extends from approximately the start of the decreasing radius portion 105 of the cam recess edge to the centre of the dwell portion 98, the ramp 82 extending from the centre of the dwell portion 98 just beyond the start of the increasing radius portion 99, and the ramp 83 being substantially co-extensive with the dwell portion 104. The deeper portion 84 of the cam recess extends from just beyond the start of the increasing radius portion 99 of the cam to the end of the decreasing radius portion 103.

A stop arm 106, pivoted at 107 to swing in a horizontal plane, has two steps 108 and 109, as shown in FIGURE 4, formed on a lug 111 to co-operate with the pin 94 and limit the swing of the lever 76. The stop arm 106 is urged by a spring 112 to a position in which both steps 108 and 109 are clear of the path of the pin 94. A trigger arm 113, pivoted to a fixed support at 114 and arranged to be depressed to different extents by 10 inch and 12 inch records respectively when they drop on to the turntable, engages with a link 115 to lift it and to rock, through the said link, an intermediate lever 116 of bell-crank form which acts on the edge of the stop arm 106 to move it about its pivot. A detent 177 co-operates with notches 118 and 119 in the link 115 to hold it in the position to which it is lifted, the detent being disengaged automatically by conventional means, at the end of a cycle of the cycling cam.

The post 87 carries at its lower end, an arm 121 (FIGURE 4) to which is pivoted a link 122 slotted longitudinally at 123 to engage a pin 124 mounted on the baseplate 70, the said link providing a limit stop for outward movement of the pick-up arm 86.

The apparatus described with reference to FIGURES 3 to 7 operates in the following manner. At the commencement of a control cycle, the cycling cam 74 is in the position shown in FIGURES 3 and 4, and the pin 78 is resting on the dwell portion 98 of the cam recess edge and is in the shallower portion 85 of the cam recess, so that the lever 89 is in its lower position and, the pick-up being supported by the stylus resting on a record on the turntable (position A in FIGURE 6), the pin 97 is clear of the grooves 96 in the lever arm 91. The lever 76 is in the position shown in FIGURE 4 (and in position A in FIGURE 7). The initial rotation of the cycling cam 74 causes the pin 78 to ride up the ramp 82 to position B in FIGURE 7, lifting the pick-up to position B in FIGURE 6, and, as rotation of the cycling cam continues, the pin 78 rides along the increasing radius portion 99 of the cam edge, allowing the lever 76 to swing, under the influence of the spring 81, anti-clockwise in FIGURE 4, causing the lever 89 to swing clockwise and move the pick-up arm 86 outwardly clear of the turntable, the motion of the pick-up arm being limited by the stop mechanism 122, 123, 124. As the follower pin 78 travels along the dwell portion 100 of the cam, the record releasing mechanism allows a record to fall on to the turntable, and, if the record is of 10 inch or 12 inch size, it rocks the trigger arm 113, lifts the link 115, and moves the appropriate step on the stop arm 106 into the path of the pin 94. The detent 117 holds the stop arm in this position. The follower pin 78 now travels along the increasing radius portion 101 of the cam recess edge, causing the lever 76 to swing further in an anti-clockwise direction, and the lever 89 to swing further in a clockwise direction. Since the pick-up arm is held against further outward movement by its stop mechanism, the lever arm 91 moves relatively to it, and the pin 97 moves into a notch 96 in the said lever arm depending on the movement of the lever 76 allowed by the stop arm 106. When the lever 76 engages the said stop arm, the follower pin 78 moves away from the edge of the cam recess and re-engages the said edge on the decreasing radius portion 103 when the cycling cam has turned through a further angle, the said follower pin then riding down that decreasing radius portion to swing the pick-up in to the starting position. The pick-up head 75 is now in the position shown at C in FIGURE 6, and the follower pin 78 is at the position shown at C in FIGURE 7.

The follower pin 78 next runs along the dwell portion 104 of the cam recess edge and down the ramp 83, bringing the pick-up head 75 to the position D in FIGURE 6, so that the stylus engages the record, and at once releasing the pin 97 from the groove 16 in the lever arm 91. Finally, the follower pin travels along the decreasing radius portion 105 of the cam groove edge to return the levers 76 and 89 to the positions shown in FIGURE 4.

The stop arm 106 is released by the releasing of the detent 117 to allow it to return to its initial position.

If the record dropped on to the turntable is of 7 inch size, the stop arm 126 remains in its initial position, and the lever 76 moves through its full travel, the follower pin 78 following the cam recess edge around its whole periphery.

It will be understood that the invention is not limited to the two embodiments specifically described herein, but that changes may be made in the mechanism without departing from the scope of the claims. For example, the arrangement of the sizing trigger lever and the manner in which its movement is transmitted to the stop arm may be changed.

I claim:

1. In automatic apparatus for reproducing sound recorded on grooved disc records which comprises, turntable means, means including a motor for rotating said turntable, spindle means for storing a plurality of disc records of assorted standard-diameter sizes before playing, means for successively depositing each of said plurality of records in turn on said turntable, pickup arm means mounted on said apparatus and adapted to contact a record positioned on and rotated by said turntable means to pickup a signal therefrom, means including a speaker to convert said signal into audible sound, means for swinging said pickup arm outwardly clear of said turntable to permit a record to be played to be deposited thereon and to swing said pickup arm inwardly to one of a plurality of predetermined starting positions each starting position corresponding to one of the standard-diameter record sizes, sizing means for identifying the standard diameter size of the record to be played, and means for determining the extent of inward swinging movement of said pickup arm in order to place said pickup arm at the predetermined starting position appropriate to the record to be played, the improvement which comprises: in combination, a cycling cam driven by said motor, a first lever and a second lever each having one end thereof pivotally connected to the body of said apparatus, means for connecting said first lever to said second lever, means for engaging one of a plurality of positions on said second lever with said pickup arm, sizing means separate from said pickup arm for identifying the standard-diameter size of the record to be played, and means for selectively coupling said pickup arm and said second lever at one of said plurality of positions on said second lever determined by the size of the record to be played, said cycling cam, said first and second levers and said pickup arm being in operative engagement at the beginning of a cam cycle whereby rotation of said cam causes said pickup arm to swing outwardly clear of said turntable to a predetermined fixed stop position while the record to be played is deposited in playing position, further rotation of said cycling cam causing said means for selective coupling to move relative to said second lever to the extent necessary to couple with said lever at the position thereon determined by said sizing means, said cam as it completes one cycle of revolution causing said first lever to operate said second lever to disconnect the latter from said pickup arm, whereby said pickup arm is free to follow the groove in the record being played without restraint from said system of levers.

2. Automatic apparatus for reproducing sound according to claim 1, wherein the means for engaging said second lever with said pickup arm include two members in frictional contact.

3. Automatic apparatus for reproducing sound according to claim 1, wherein the means for engaging said second lever with said pickup arm comprise a plurality of grooves or notches in said second lever spaced angularly about the pivot of said lever, and a pin adapted to engage in said grooves or notches.

4. Automatic apparatus for reproducing sound according to claim 1, wherein said first lever is adapted to swing horizontally when actuated by said cycling cam and to engage said second lever which is pivotally mounted around the axis upon which said pickup arm swings, said first lever also being adapted to be swung in an up and down direction by said cycling cam to make and break the connection between said second lever and pickup arm.

5. Automatic apparatus for reproducing sound according to claim 4, wherein the connection between said second lever and said pickup arm is dependent on the weight of said pickup arm being supported by that lever whereby said connection is immediately broken by engagament of the pickup arm with a record thus relieving said connection of the weight of said pickup arm.

6. Automatic apparatus for reproducing sound according to claim 4, wherein said second lever is also pivoted to swing in a vertical plane.

7. Automatic apparatus for reproducing sound according to claim 4, wherein the second lever is mounted for vertical sliding movement.

References Cited

UNITED STATES PATENTS

| | | | |
|---|---|---|---|
| 3,023,009 | 2/1962 | Dale | 274—10 |
| 3,129,006 | 4/1964 | Zahner et al. | |
| 3,218,078 | 11/1965 | Freier | 274—10 |
| 3,332,689 | 7/1967 | Dennis | 274—10 |

HARRY N. HAROIAN, Primary Examiner

U.S. Cl. X.R.

274—10